United States Patent
Smith

(10) Patent No.: US 9,744,384 B2
(45) Date of Patent: Aug. 29, 2017

(54) ENHANCED DISPLAY FOR BREATHING APPARATUS MASKS

(71) Applicant: Rivada Research, LLC, Colorado Springs, CO (US)

(72) Inventor: Clint Smith, Warwick, NY (US)

(73) Assignee: RIVADA RESEARCH, LLC, Colorado Springs, CO (US)

( * ) Notice: Subject to any disclaimer, the term of this patent is extended or adjusted under 35 U.S.C. 154(b) by 677 days.

(21) Appl. No.: 13/668,511

(22) Filed: Nov. 5, 2012

(65) Prior Publication Data

US 2013/0112195 A1     May 9, 2013

Related U.S. Application Data

(60) Provisional application No. 61/628,692, filed on Nov. 5, 2011.

(51) Int. Cl.
    *A62B 18/08*      (2006.01)
    *G02B 27/01*      (2006.01)

(52) U.S. Cl.
    CPC ............ *A62B 18/08* (2013.01); *G02B 27/017* (2013.01); *G02B 2027/0127* (2013.01)

(58) Field of Classification Search
    CPC ....... A62B 18/08; A62B 18/02; A62B 18/045; A62B 18/082; A62B 18/084; G02B 27/017; B63C 2011/121; G09B 9/307
    USPC ........... 128/205.23, 201.22–201.29, 202.22, 128/204.21, 204.26, 206.21, 207.11
See application file for complete search history.

(56) References Cited

U.S. PATENT DOCUMENTS

| | | |
|---|---|---|
| 3,981,023 A | 9/1976 | King et al. |
| 4,000,419 A | 12/1976 | Crost et al. |
| 4,080,532 A | 3/1978 | Hopper |
| 4,142,207 A | 2/1979 | McCormack et al. |
| 4,253,765 A | 3/1981 | Kato et al. |
| 4,544,844 A | 10/1985 | Moyers |
| 4,653,879 A | 3/1987 | Filipovich |
| 4,674,880 A | 6/1987 | Seki |
| 4,826,302 A | 5/1989 | Afsenius |
| 5,033,818 A * | 7/1991 | Barr ........................ B63C 11/12 2/428 |
| 5,138,555 A * | 8/1992 | Albrecht .............. G02B 27/017 340/980 |
| 5,243,448 A | 9/1993 | Banbury |
| 5,301,668 A * | 4/1994 | Hales ..................... A62B 18/08 128/200.24 |
| 5,405,811 A | 4/1995 | Kerko et al. |
| 5,414,439 A | 5/1995 | Groves et al. |
| 5,521,725 A | 5/1996 | Beeson et al. |
| 5,555,569 A * | 9/1996 | Lane .................................. 2/424 |
| 5,763,882 A | 6/1998 | Klapper et al. |
| 5,764,203 A | 6/1998 | Holmlund et al. |

(Continued)

*Primary Examiner* — Annette Dixon
(74) *Attorney, Agent, or Firm* — The Marbury Law Group, PLLC

(57) ABSTRACT

Various embodiments provide a self contained breathing apparatus mask including a visor, a wireless communication device configured to receive information, and a display connected to the wireless communication device and configured to display the received information to a user wearing the mask. The display may be positioned on the breathing apparatus mask such that the user may simultaneously see the display and look through the visor.

11 Claims, 22 Drawing Sheets

(56) References Cited

U.S. PATENT DOCUMENTS

| | | | |
|---|---|---|---|
| 6,360,182 B1 * | 3/2002 | Hales | A62B 18/08 128/201.27 |
| 6,899,101 B2 * | 5/2005 | Haston | B63C 11/14 128/201.27 |
| 7,038,639 B1 | 5/2006 | Olstad et al. | |
| 7,245,440 B2 * | 7/2007 | Peseux | 359/666 |
| 7,398,097 B2 | 7/2008 | Parkulo | |
| 7,534,005 B1 * | 5/2009 | Buckman | A61F 9/068 2/8.2 |
| 2001/0010225 A1 * | 8/2001 | Keller | A62B 9/006 128/201.25 |
| 2002/0093466 A1 | 7/2002 | Ben-Arie | |
| 2003/0007203 A1 | 1/2003 | Amon et al. | |
| 2005/0001728 A1 | 1/2005 | Appelt et al. | |
| 2005/0270260 A1 | 12/2005 | Pelzer et al. | |
| 2006/0279848 A1 * | 12/2006 | Kuiper | G02B 3/08 359/666 |
| 2007/0000031 A1 * | 1/2007 | Makris | A42B 3/0433 2/411 |
| 2007/0181129 A1 * | 8/2007 | Mattinson | A62B 9/006 128/206.21 |
| 2007/0205903 A1 * | 9/2007 | diMarzo | A62B 99/00 340/573.1 |
| 2008/0023002 A1 * | 1/2008 | Guelzow | A42B 3/042 128/201.24 |
| 2008/0062128 A1 | 3/2008 | Brodersen et al. | |
| 2008/0155426 A1 | 6/2008 | Robertson et al. | |
| 2008/0185001 A1 * | 8/2008 | McWilliams | G02B 27/017 128/204.21 |
| 2008/0204869 A1 | 8/2008 | Stewart | |
| 2009/0073118 A1 | 3/2009 | Yamaji et al. | |
| 2009/0144639 A1 | 6/2009 | Nims et al. | |
| 2009/0168144 A1 | 7/2009 | Lo et al. | |
| 2010/0240988 A1 * | 9/2010 | Varga | G02B 27/017 600/425 |
| 2010/0308991 A1 | 12/2010 | Adams et al. | |
| 2012/0075168 A1 * | 3/2012 | Osterhout | G02B 27/017 345/8 |

* cited by examiner

ABSTRACT

ENHANCED DISPLAY FOR BREATHING APPARATUS MASKS

CROSS-REFERENCE TO RELATED APPLICATIONS

This application claims the benefit of priority to U.S. Provisional Patent Application Ser. No. 61/628,692 filed Nov. 5, 2011, which is hereby incorporated herein by reference in its entirety.

BACKGROUND

Each day workers put themselves at risk by working in dangerous or potentially dangerous environments involving explosive vapors or gasses. For example, in addition to the risk of cave-ins, sub-surface miners face the risk of toxic fumes and explosive gases on a daily basis. As another example, firemen and other first responders frequently have to venture into buildings, subways, and sewers filled with toxic and explosive gasses in order rescue victims and save property.

Chief among the dangers facing such workers is the reduced visibility and loss of situation awareness when entering an environment after donning their protective breathing apparatus.

For personnel who work in such environments on a daily basis, a communication system to improve situation awareness is needed so that personnel can safely operate in toxic and explosive environments. Similarly, emergency services personnel who may have to enter toxic and explosive environments to respond to emergency situations need to improve the situation awareness both in terms of communication as well as visual and other telemetry methods.

SUMMARY

The various embodiments include a self contained breathing apparatus mask having a visor, a wireless communication device configured to receive information, and a display connected to the wireless communication device and configured to display the received information to a user wearing the mask, wherein the display is positioned such that the user may simultaneously see the display and look through the visor.

Various additional embodiments include a breathing device that includes a non-conductive housing, a visor hermetically sealed inside the non-conductive housing, an electronic display coupled to the visor, an inhalation connection configured to provide human-breathable air inside of the non-conductive housing, a receiver configured to receive wireless communication signals, and a processor coupled to electronic display and receiver. In an embodiment, the processor may be configured with processor executable software instructions to perform operations that include receiving data via a wireless communication link, and rendering the received data on the electronic display so that a user may simultaneously view the display and look through the visor.

In an embodiment, the electronic display may be a flexible light emitting diode display. In various embodiments, the electronic display may be coupled to the visor inside the non-conductive housing or outside the non-conductive housing. In a further embodiment, the electronic display may be coupled to an adjustable focusing device. In a further embodiment, the adjustable focusing device may be an adjustable electrowetting lens device. In a further embodiment, the adjustable electrowetting lens device may include a tapered housing.

In a further embodiment, the breathing device may include a sensor module hermetically sealed inside the non-conductive housing. In an embodiment, the processor may be configured with processor executable software instructions to perform operations that include rendering output from the sensor on the electronic display. In various embodiments, the sensor module may include one or more of a carbon monoxide sensor, an oxygen sensor, a heat sensor, a near infrared sensor, an infrared detector, an ultrasound device, a spectrometry device, a camera, and a microphone.

Further embodiments include a communication system for use in an explosive or toxic environment including a first and second breathing relay device, each of which may include, a non-conductive housing, a visor hermetically sealed inside the non-conductive housing, an electronic display coupled to the visor, an inhalation connection configured to provide human-breathable air inside of the non-conductive housing, a receiver configured to receive wireless communication signals, and a processor coupled to electronic display and receiver. In an embodiment, the processor may be configured with processor executable software instructions to perform operations that include receiving data via a wireless communication link, and rendering the received data on the electronic display so that a user may simultaneously view the display and look through the visor. In an embodiment, the processor of the first breathing device may be further configured with processor executable software instructions to perform operations further including, establishing a communication link with the second breathing device.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain features of the invention.

DETAILED DESCRIPTION

Figure 1:
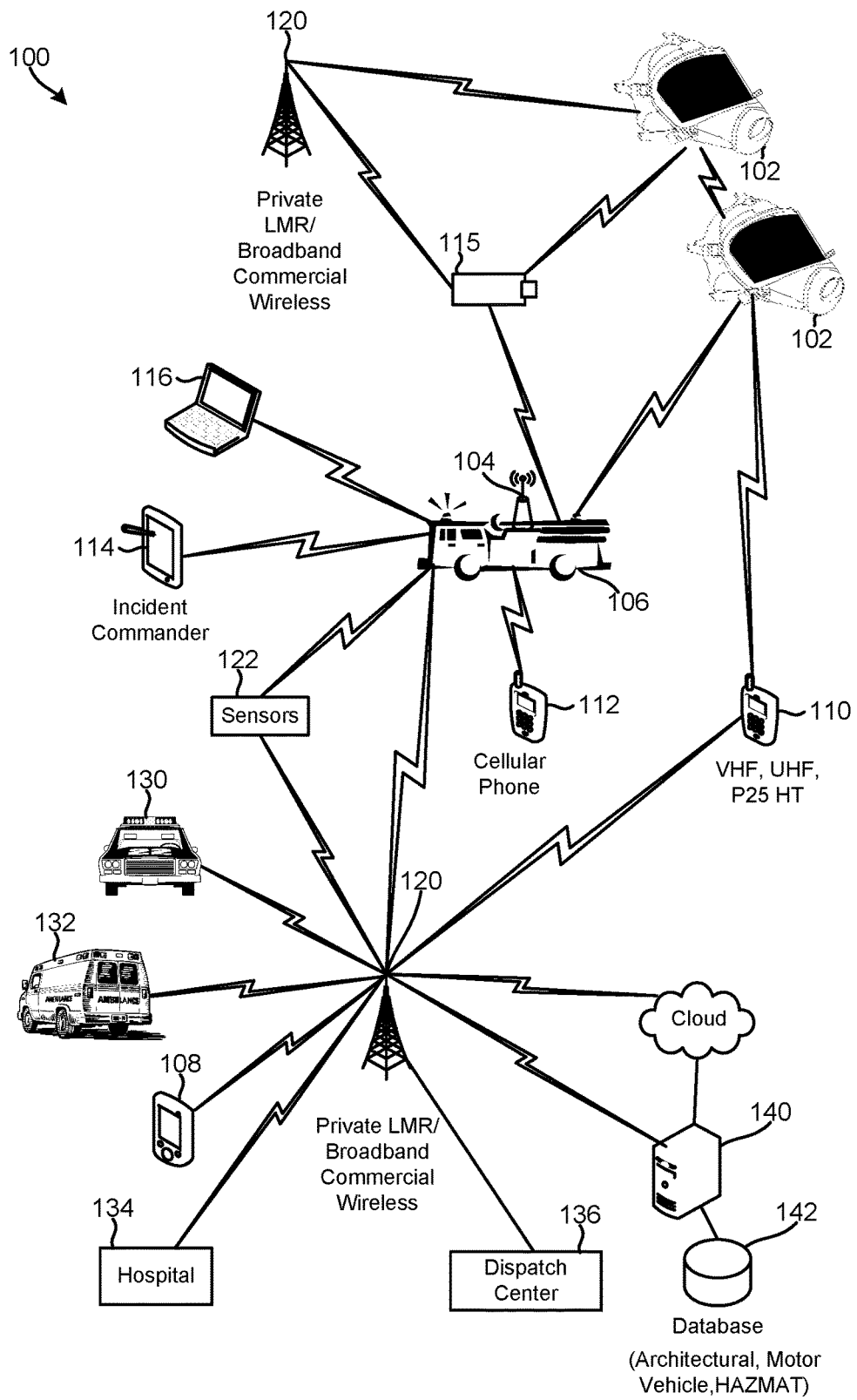
FIG. 1 is a system block diagram illustrating information flows, communication links, and components in an example communication system in which an embodiment enhanced display breathing apparatus mask may be deployed.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "cellular telephone," "cellular radio", and "cell phone" are used interchangeably herein to refer to any one or all of cellular telephones, smartphones, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals.

The terms "wireless network," "network," "cellular system," "cell tower," and "radio access point" are used generically herein to refer to any one of various wireless mobile systems, technologies, and/or components. In an embodiment, a wireless network may be a radio access point (e.g., a cell tower), which provides a radio link to the mobile device so that the mobile device can communicate with core network components.

A number of different methods, technologies, solutions, and techniques (herein collectively referred to as "solutions") are currently available for determining the location of a mobile device, any or all of which may be implemented by, included in, and/or used by the various embodiments. Such solutions include, e.g., global positioning system (GPS) based solutions, assisted GPS (A-GPS) solutions, and cell-based positioning solutions such as cell of origin (COO), time of arrival (TOA), observed time difference of arrival (OTDOA), advanced forward link trilateration (AFLT), and angle of arrival (AOA). In various embodiments, such solutions may be implemented in conjunction with one or more wireless communication technologies and/or networks, including wireless wide area networks (WWANs), wireless local area networks (WLANs), wireless personal area networks (WPANs), and other similar networks or technologies. By way of example, a WWAN may be a Code Division Multiple Access (CDMA) network, a Frequency Division Multiple Access (FDMA) network, an OFDMA network, a 3GPP LTE network, a WiMAX (IEEE 802.16) network, or similar network. The WPAN may be a ®Bluetooth® data link, an IEEE 802.15x data link, and networks based on similar communication technologies. A WLAN may be an IEEE 802.11x network, and networks based on similar communication technologies. A CDMA network may implement one or more radio access technologies (RATs) such as CDMA2000, Wideband-CDMA (W-CDMA), and later versions of CDMA technologies.

As used in this application, the terms "component," "module," "engine," "manager" are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computer, a server, network hardware, etc. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iDEN), and land mobile radio (LMR). Each of these technologies involves, for example, the transmission and reception of voice, data, signaling and/or content wireless communications.

It should be understood that any references to terminology and/or technical details related to an individual telecommunication standard or technology are for illustrative purposes only, and are not intended to limit the scope of the claims to a particular communication system or technology unless specifically recited in the claim language.

As discussed above, firemen and other first responders frequently have to venture into buildings, subways, and sewers filled with toxic and explosive gasses. Such environments generally require the use of breathing masks, such as self contained breathing apparatus (SCBA), compressed air breathing apparatus (CABA), industrial breathing sets, self-contained underwater breathing apparatus (SCUBA), and/or other similar breathing apparatuses that provide breathable air in atmospheres that pose an immediate danger to life and health (typically called IDLH Atmospheres). These breathing masks are commonly coupled to or include a high-pressure tank, a pressure regulator, an inhalation connection, and a protective transparent lens, visor, or shield. The protective transparent lens/visor/shield allows a wearer to view his/her immediate surroundings, but with reduced visibility and situation awareness.

The various embodiments include enhanced displays configured for use with breathing masks to improve a wearer's visibility and situation awareness. As mentioned above, a breathing mask of a self contained breathing apparatuses (SCBA) may limit a user's field of view and/or otherwise interfere with a user's situation awareness. Various embodiment displays may be coupled with a breathing mask to provide a user with information from various sources, such as from a network connection or sensors, to increase the user's situation awareness. The combination of an embodiment display and a self contained breathing apparatus mask may be referred to herein as an enhanced breathing apparatus mask or simply an enhanced mask.

FIG. 1 illustrates exemplary components in a communication system 100 according to an embodiment. In the example illustrated in FIG. 1, the system 100 includes two embodiment enhanced breathing apparatus masks 102, although any number of enhanced breathing apparatus masks 102 may be implemented at the same time in the various embodiments. Each enhanced breathing apparatus masks 102 may be wirelessly connected to a local or small cell site 104 either directly or indirectly, such as via an intermediate relay device 115.

The local/small cell site 104 may be installed at the incident scene or on a mobile platform, such as the illustrated fire engine/truck 106. The local/small cell site 104 may be configured to communicate with one or more sensor modules 122 and various mobile devices, such as the illustrated cellular phone 112, handheld computer-like tablet of an incident commander 114, and laptop 116. The local/small cell site 104 may also be configured to communicate with a variety of other mobile devices and communication centers via the radio access node 120 coupled to a commercial or private cellular communications network. In the example illustrated in FIG. 1, the local/small cell site 104 communicates with safety personnel 130, emergency medical services 132, smartphones 108, hospitals 134, dispatch centers 136, remote servers 140 such as with one more databases 142 (e.g., databases with architectural, motor vehicle, Hazmat, etc. information), and radio access devices 110, all via the radio access node 120.

The radio access nodes 120 may operate to connect voice and data calls between mobile devices (e.g., mobile phones), data centers, the local/small cell site 104, the enhanced masks 102, and/or other network destinations, such as via telephone land lines (e.g., a POTS network, not shown) and the Internet. In various embodiments, the radio access nodes 120 may include any wireless base station or radio access point (e.g., LTE, CDMA2000/EVDO, WCDMA/HSPA, IS-136, GSM, WiMax, WiFi, AMPS, DECT, TD-SCDMA, or TD-CDMA), a switch, Land Mobile Radio (LMR) interoperability equipment, a satellite Fixed Service Satellite (FSS) for remote interconnection to the Internet and PSTN, a network operations center, and/or other components for sending and receiving communication signals to and from various network components.

When implemented in a 3GPP-LTE network, radio access nodes 120 may include an Evolved Serving Mobile Location Center (E-SMLC) component configured to send and receive location information (e.g., latitude, longitude, altitude, velocity, etc.) to and from the mobile devices and enhanced masks 102, which may be achieved both on-net and off-net. The location information may be delivered in standard formats, such as those for cell-based or geographical co-ordinates, together with the estimated errors (uncertainty) of the location, position, altitude, and velocity of a mobile device and, if available, the positioning method (or the list of the methods) used to obtain the position estimate. In an embodiment, the E-SMLC may be configured to provide location services via a lightweight presentation protocol (LPP) that supports the provision of application services on top of TCP/IP networks. In an embodiment, the E-SMLC may also send and/or receive (e.g., via LPP) almanac and/or assistance data to and from core components, such as an eNodeB and a mobility management entity (MME).

The enhanced masks 102 may include communications circuitry for sending and receiving voice, data, content, images, video, broadband information, and other communications/information to and from each other 102, the local/small cell site 104, mobile devices 108, 110, and cellular communications networks (both commercial and private) such as via a radio access node 120. The mobile devices 108, 110 may include smartphones 108 or other radio communication devices 110 (e.g., VHF, UHF, LMR, and/or P25 HT communications devices), configured to present voice, data, content, images, video and broadband information to a person wearing or holding the respective device 108, 110.

An enhanced mask 102 may include one or more embodiment displays coupled to a breathing apparatus. The enhanced mask 102 may include one or more visors through which a user/wearer may view his/her surroundings. The enhanced mask 102 may include a conically shaped nozzle portion shaped to limit air circulation and cover a user/wearer's mouth and face. Alternate embodiment masks may not include the nozzle portion and/or may include any number of visors and/or windows.

The various embodiments provide displays that may be coupled with a breathing mask to provide an enhanced breathing mask. The display may be positioned such that the user may simultaneously see the display and look through the visor.

Figure 2A:
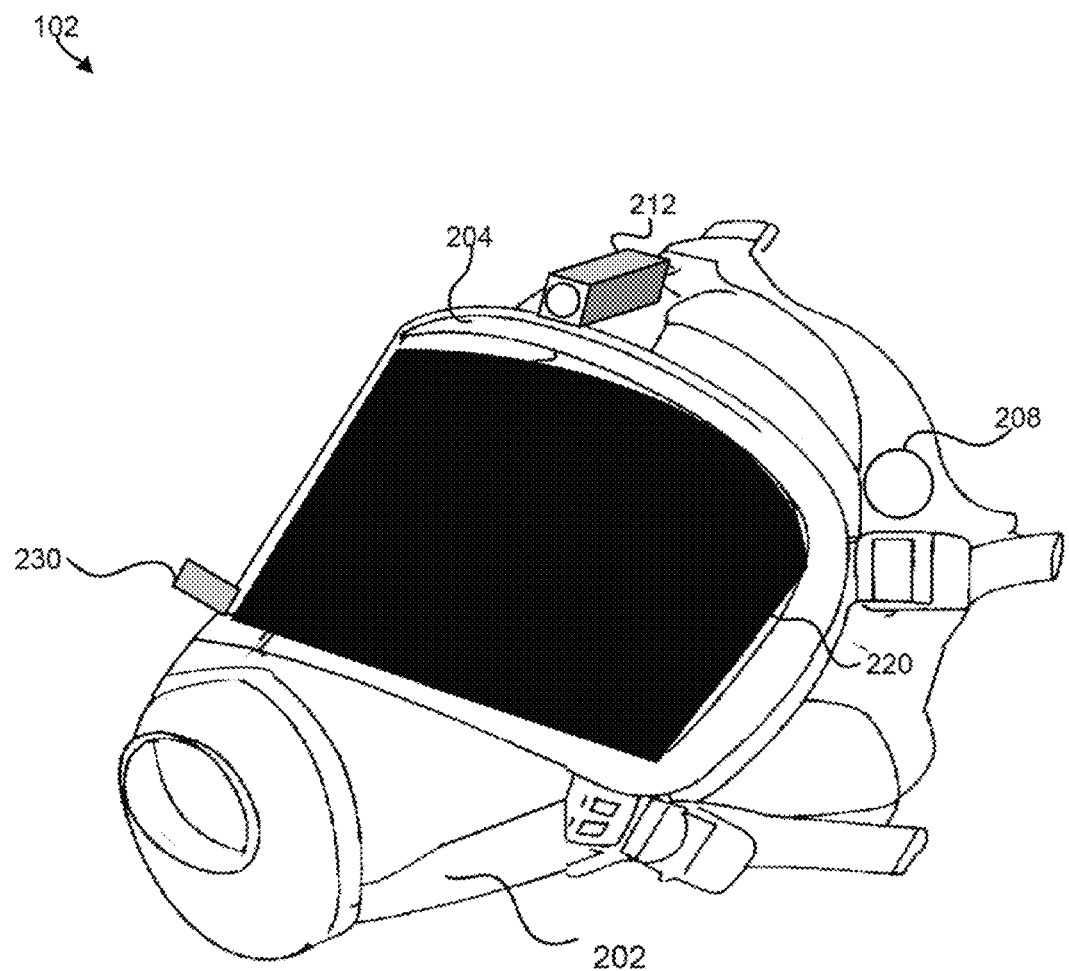
FIG. 2A-2E are illustrations of various embodiment enhanced displays and breathing apparatus masks.

Various embodiments may include different arrangements of one or more displays. For example, FIG. 2A illustrates an exemplary enhanced mask 102 with a nozzle portion 202 that fits over a user's nose and mouth, a visor 204 through which the user sees, and an electronic display 220. The embodiment enhanced mask 102 may also include a wireless radio 208 and other communications circuitry for sending and receiving voice, data, content, images, video, broadband information, and other communications/information to and from other mask 102, the local/small cell site 104, mobile devices 108, 110, and cellular communications networks (both commercial and private) such as via a radio access node 120. The display 220 may be connected to the radio 208 wirelessly or by one or more wires. In an embodiment, the enhanced mask 102 may be configured to display information received on the radio 208 on the electronic display 220.

The electronic display 220 may be any or all of a variety of displays and display technologies, such as a light emitting diode (LED) display, an organic light emitting diode (OLED) display, a liquid crystal display (LCD), cathode ray tube (CRT) display, a plasma screen display, etc. The display 220 may be molded to the contour of the visor 204, such as illustrated in FIG. 2A. Some breathing apparatus masks rely on a curved visor 204. In various embodiments, the display 220 may be flexible, such as a flexible organic light emitting diode (FOLED) display that may flex to fit the curve of the visor 204.

In various embodiments, the display 220 may be transparent, such as a transparent OLED (TOLED) display. These transparent OLED displays may allow a user to see through the display 220 and visor 204. In further embodiments the display may be both transparent and flexible.

The display 220 may be a black and white or monochrome display or a display with multiple colors. The display 220 may be adjusted manually or automatically based on ambient light.

In various embodiments, the display may actively display information in coordination with what the user sees through the visor 204, such as highlighting or drawing attention to objects in the user's line of sight or providing relevant information based on what the user is seeing. In further embodiments, a transparent display 220 may allow visual wire mapping of an object or person or anything of interest to be projected to have enhanced confirmation of what is being viewed.

Various embodiments may include a processor coupled to the enhanced breathing mask facial recognition that is configured with processor-executable instructions to recognize features in camera images and generate outlines and symbols that may be of aid to the wearer. For example, the system processor may be configured to accomplish building recognition, and/or identify machinery, weapons, hazmat symbols and other objects that existing or future scanning methods may recognize. For example, the enhanced breathing mask 102 may include a camera 212 or other sensor as further discussed below, any or all of which may be mounted in any of a number of locations on the mask, including at the mounting locations illustrated in the FIGs. Information from this sensor (e.g., images or video) may be transmitted by the radio 208 to an external processor or server, and the radio 208 may receive from the external processor or server identification information regarding a face or object in a transmitted image. The received information may be displayed on display 220. Databases 142, such as architectural, motor vehicle, and hazmat databases, and other network resources may be used by an external processor or server for such recognition methods.

In various embodiments, embodiment enhanced masks 102 may include a control knob 230 that may allow a user to adjust various settings associated with the display 220, such as brightness, contrast, intensity or focus. For example, the control knob 230 may be used to focus the display 220 via an electrowetting lens system described herein.

Figure 2B:
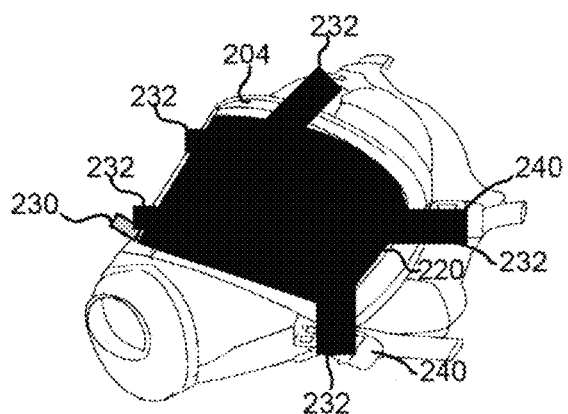

In various embodiments, the display 220 may be mounted on the outside or inside of a breathing apparatus mask. For example, embodiments display may have a low cross sectional area and be able to fit between the back of the visor 204 and a user's face. Alternately, the display 220 may be coupled to the outside of the breathing apparatus mask over the visor 204. The display 220 may be permanently affixed to or incorporated into the breathing apparatus mask. In alternate embodiments, the display 220 may be removably coupled to the mask, such as with one or more mechanical latches or clips. For example, FIG. 2B illustrates clips 232 which attach the display 220 by connecting to the breathing apparatus mask's existing webbing connections 240.

Figure 2C:
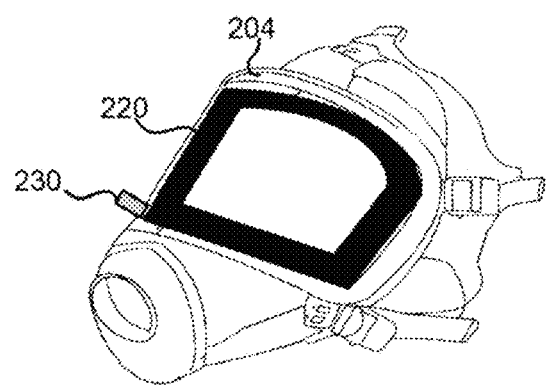
Figure 2D:
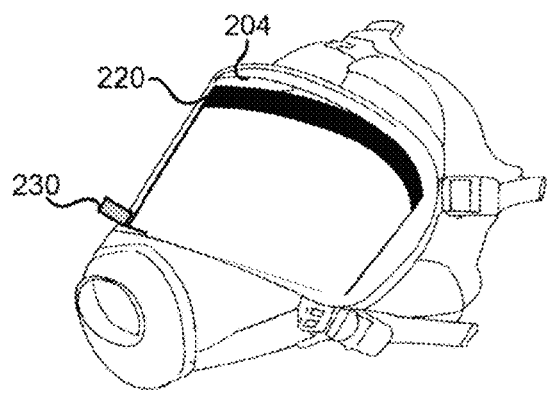
Figure 2E:
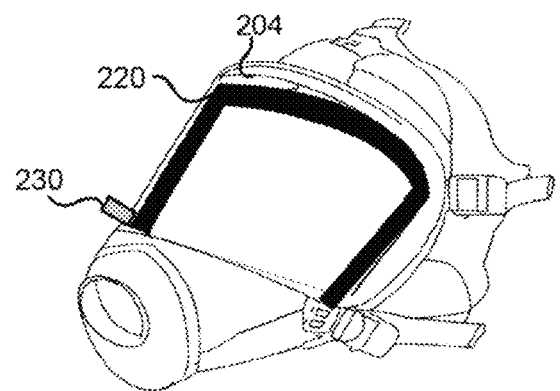

In various embodiments, the display 220 may be configured in different shapes or arrangements. FIGS. 2C-2E illustrate exemplary arrangements of displays 220. FIG. 2C illustrates an embodiment mask 102 with a display 220 arranged around the edges of a visor 204. FIG. 2D illustrates an alternate arrangement with a display 220 along only the upper edge of the visor 204. FIG. 2E illustrates an alternate arrangement with a display along the top edge and both side edges of the visor 204. Alternate arrangements like those illustrated in FIGS. 2C-2E may leave much of the visor uncovered to avoid obstructing a user's vision.

In further embodiments, the display 220 may be positioned on portions of the breathing apparatus mask that already obstruct a user's field of view. For example, a breathing apparatus mask may include seals around the edge of the visor 204 or sides of the mask to lock in air and form a positive pressure seal on the face. These seals often block a user's peripheral vision or the edges of the user's central vision. In various embodiments, displays 220 may be positioned along the seals or other adjacent parts of the mask within the user's field of view but off of the visor. In alternate embodiments, the display 220 may overlap with the visor 204 as well as seals or other adjacent parts of the mask.

Various embodiments may include one or more electrowetting lens devices. Electrowetting is the modification of a surface's wetting characteristics (i.e., modifying the contact angle or how much of a liquid contacts the surface, such as whether a liquid spreads across the surface or balls up) by applying an electric field. An electrowetting lens device may be used to control the focus of displays in breathing apparatus masks.

Figure 3A:
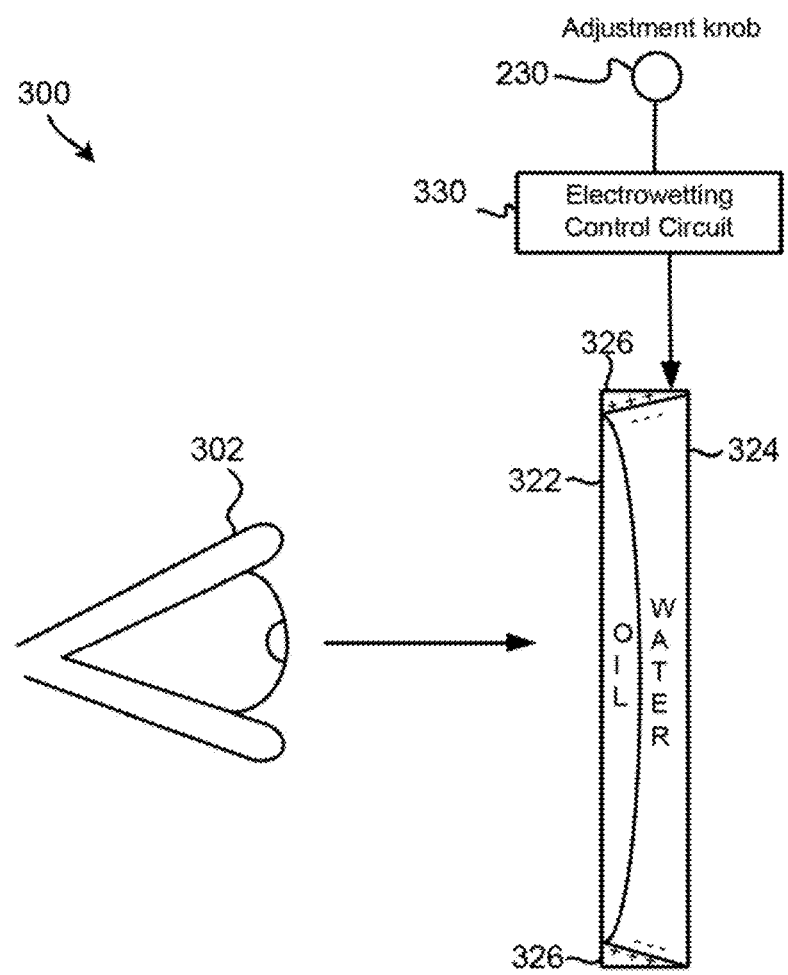
FIG. 3A is a system block diagram of an embodiment electrowetting lens device.

FIG. 3A illustrates an embodiment electrowetting lens device 300. The device 300 may have two fluids in it. For example, FIG. 3A illustrates a electrowetting lens device with oil 322 and water 324. The use of water and oil in FIG. 3A is meant for illustrative purposes, and other liquids may be used in alternate embodiments. The electrowetting control circuit 330 may apply an electric field or potential difference to the fluids via electrodes 326. The fluids 322 and 324 may shift in response to the electric field. The new position of the fluids may result in a different focal length. A user (shown as an eye 302) looking through the electrowetting lens device 300 may observe a change in focus as the fluids shift position under the electric field. The user may adjust the applied electric field, and thereby adjust the focal length and focus, by adjusting the knob 230 connected to the electrowetting control circuit 330.

Electrowetting lens devices may enable persons requiring eyeglasses to see without having to obtain special glasses or glass wear fittings for the breathing apparatus masks to remain in compliance with OSHA, NFPA, or other applicable government, industry, and insurance safety requirements.

Figure 3B:
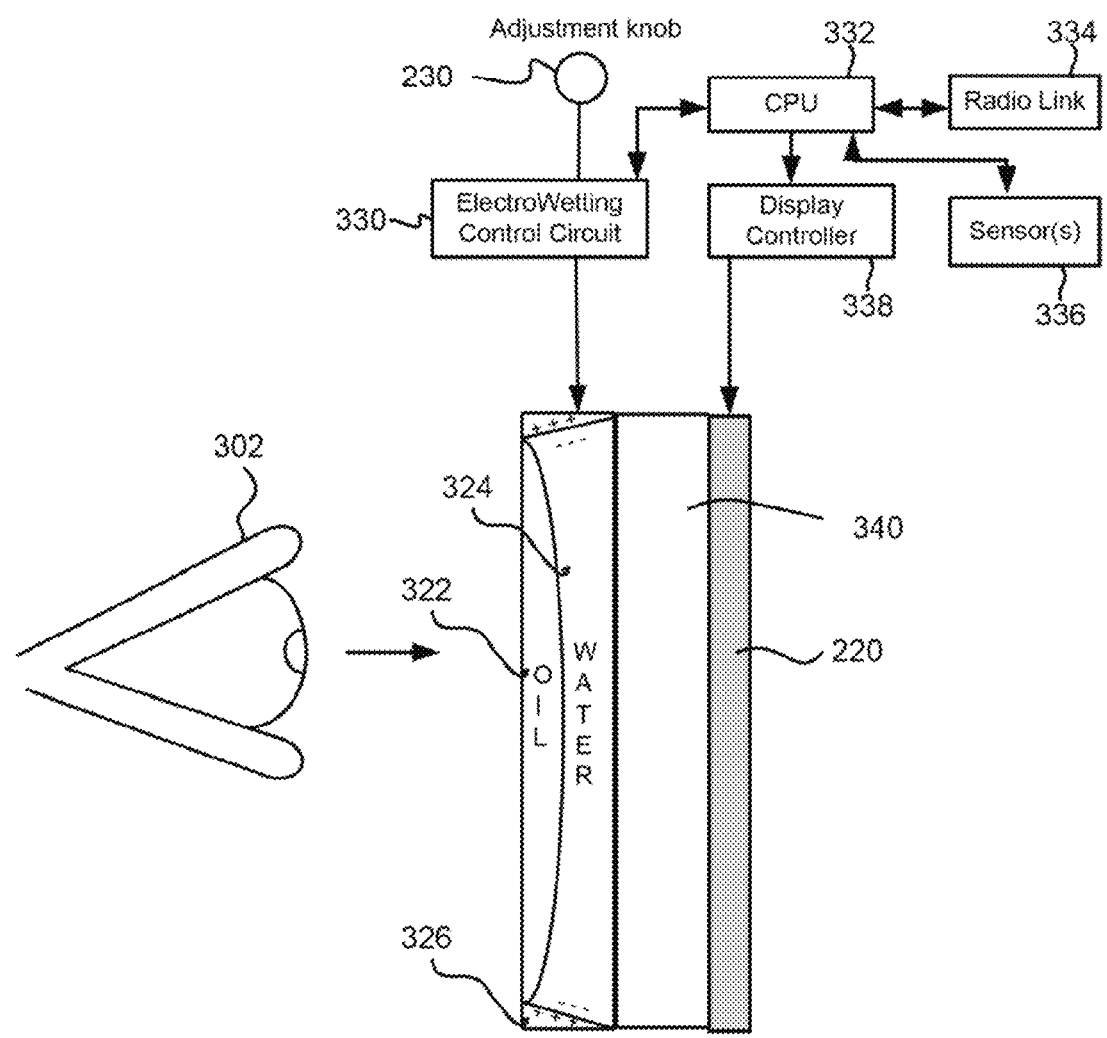
FIG. 3B is a system block diagram of an embodiment electrowetting lens device coupled to a display.

FIG. 3B illustrates an embodiment with an electrowetting lens device coupled to a display 220. A clear insulator or spacer 340 may be placed between the electrowetting lens device and the display 220 to ensure proper focus is achieved.

A CPU 332 may be connected to a radio link 334, one or more sensors 336, the electrowetting control circuit 330, and a display controller 338. The display controller 338 may be managed by the CPU 332. The display controller 338 may be used to adjust the illumination and control the display 220. The CPU 332 may receive information from the sensors 336, as well as send or receive information via the radio link 334. For example, the CPU 332 may receive additional instructions regarding what to display from a remote device or operator such as an incident commander 12.

The CPU 332 may also be connected to the electrowetting control circuit 330. The CPU 332 may thereby control the potential applied to the electrowetting lens device and the focal length. In various embodiments, the CPU 332 may automatically adjust the focus of the electrowetting lens device. In further embodiments, the CPU 332 may receive instructions via the radio link 334 to adjust the electrowetting lens device, such as from a remote control device or intermediate relay device, such as a wrist mounted control device discussed below.

In further embodiments, the mask 102 may include a Global Positioning System (GPS) device (not shown) that may determine the position of the device based on signals received from the Global Positioning System. The GPS device may be connected to the CPU 332 and radio link 334 and thereby communicate a user's location to other devices on a network.

In further embodiments, the CPU 332 along with the radio link 334 may also relay telemetry or video or still images of what is being seen by the user of the mask 102.

Figure 3C:
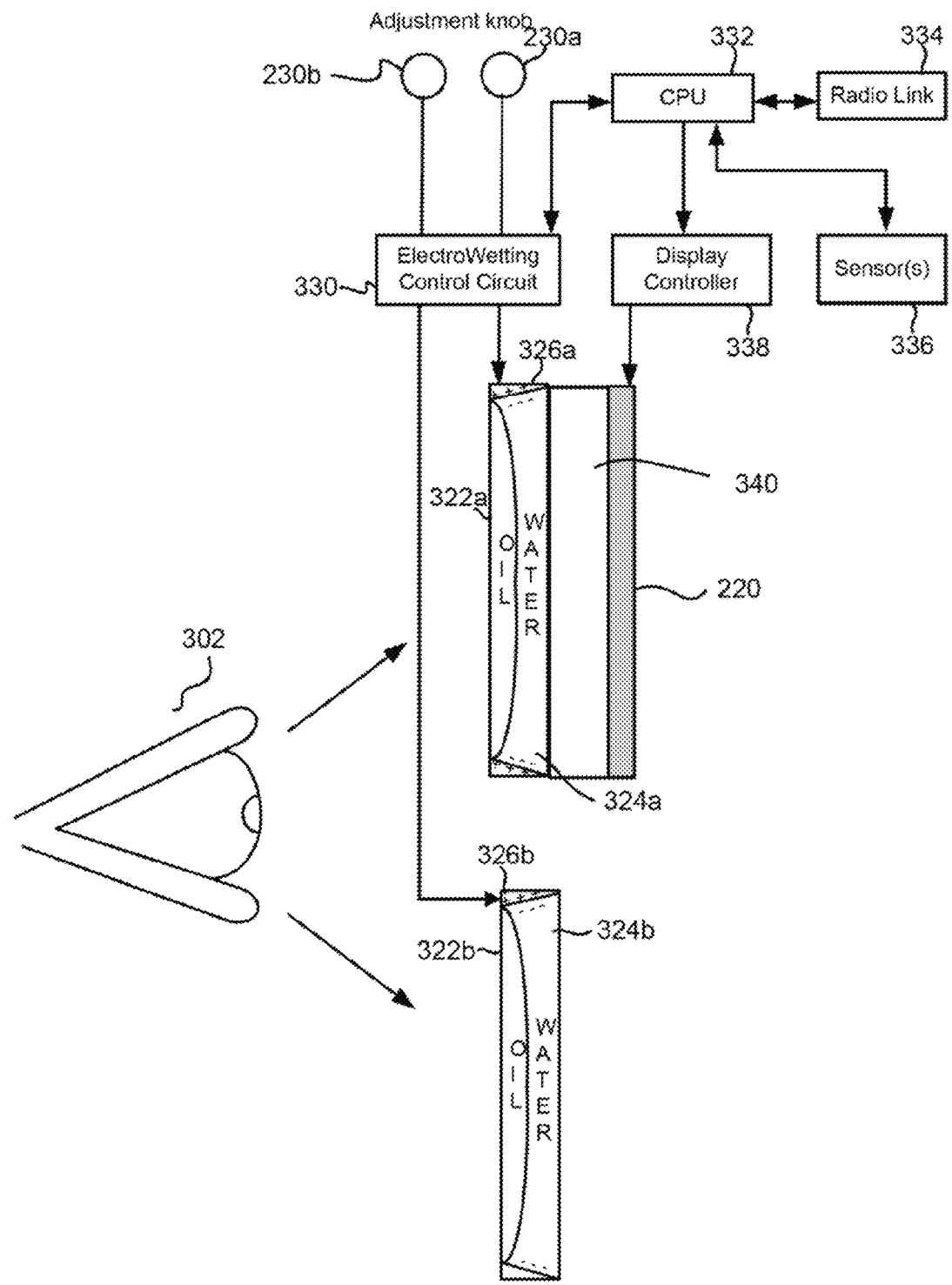
FIG. 3C is a system block diagram of embodiment system that includes two electrowetting lens devices.

In further embodiments, multiple electrowetting lens devices may be used with or without corresponding displays 220. For example, FIG. 3C illustrates an embodiment with two electrowetting lens devices. A first electrowetting lens device may include two fluids 322*a*, 324*a* and electrodes 326*a*. The first electrowetting lens device may be coupled with a display 220 as described above. A second electrowetting lens device may include two fluids 322*b*, 324*b* and electrodes 326*b*. The second electrowetting lens device may be used to focus on objects far away or close up. The first and second electrowetting lens devices may be connected to the same electrowetting control circuit 330 (as illustrated in FIG. 3C) or different control circuits. The electrowetting lens devices may have separate control knobs 230*a*, 230*b*. The electrowetting lens devices may also be controlled remotely as described above.

Figure 3D:
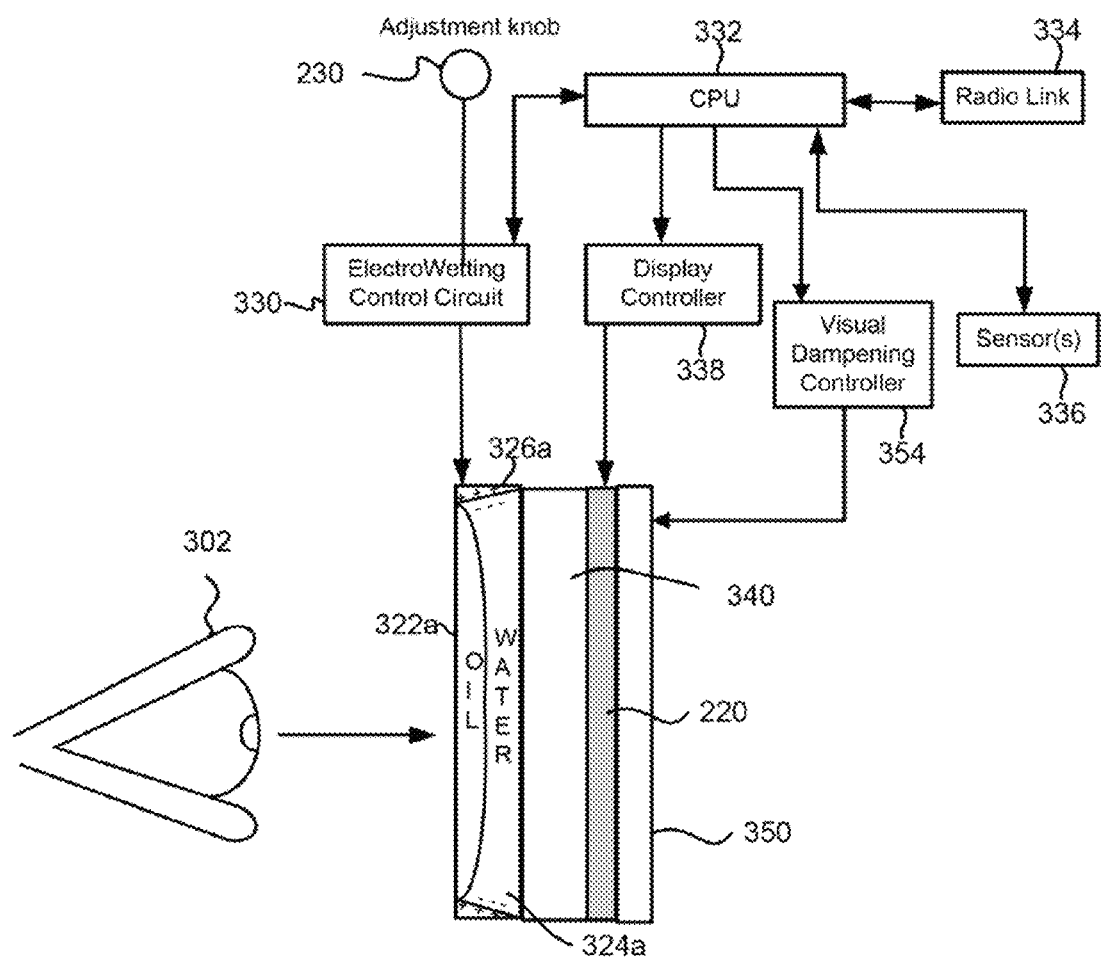
FIG. 3D is a system block diagram of an embodiment electrowetting lens device that includes a display and a visual dampening system.

In various embodiments, a screening mechanism 350 may be used to block light from escaping the mask. FIG. 3D illustrates an embodiment with an electrowetting lens device coupled with a display 220 and a screening mechanism 350. The CPU 332 may be connected to a visual dampening controller 354 that may control the screening mechanism 350.

Figure 4:
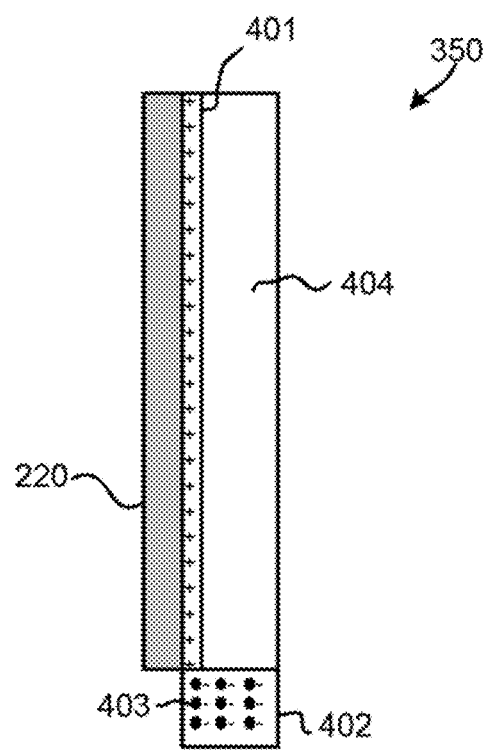
FIG. 4 is a cross-sectional diagram of a visual dampening system.

FIG. 4 illustrates an embodiment with a screening mechanism 350 coupled with a display 220. The screening mechanism 350 may include a grid plate 401, a fluid cavity 404 overlaying the grid plate 401, and a dampening fluid container 402 containing dampening fluid 403. The dampening fluid may allow light to pass only in one direction or reduce the amount of light passed in one direction. When reduced visibility is desired, the grid 401 may be charged such that fluid particles flow from container 402 into the fluid cavity 404 and temporarily adhere to the grid 401. When the grid 401 is de-energized, the dampening fluid 403 may return to the container 402.

In various embodiments, the grid 401 and other associated components may be flexible in order to enable a proper fit to the display 220 or visor 204.

FIGS. 5A-5G shows multiple possible grids 401 that may be used in various embodiments. The grid size and configuration is controlled by the visual damping controller 354. The grid 401 being controlled by the visual damping controller may energize smaller grids within the main grid affording unique display configurations meeting the user requirements. The smaller sub grids may be controlled by individually energizing each grid through use of the visual damping controller 354.

Figure 5A:
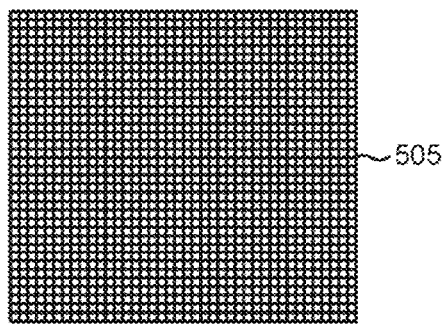
FIG. 5A-5G are illustrations of different grid configurations for an embodiment visual dampening system.
Figure 5B:
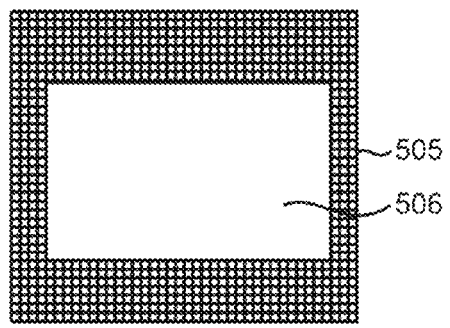
Figure 5C:
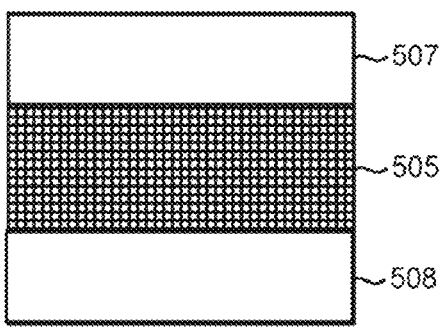
Figure 5D:
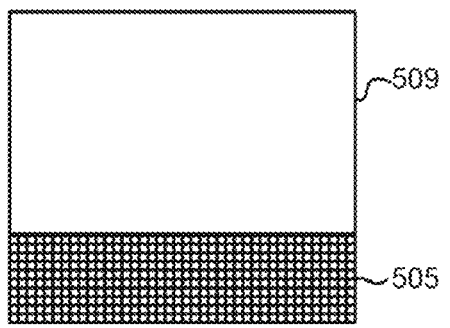
Figure 5E:
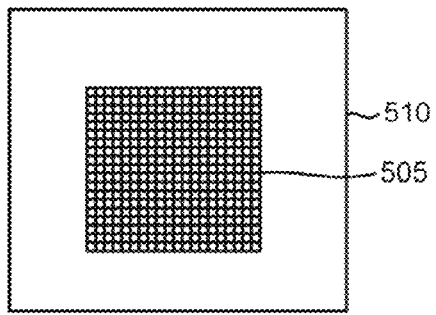
Figure 5F:
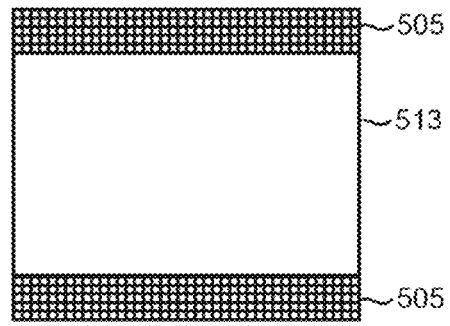
Figure 5G:
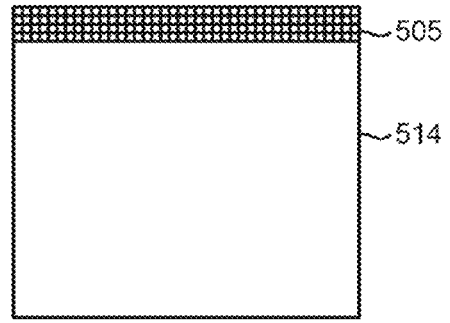

In FIG. 5A, the entire grid 505 is configured for possible use. FIG. 5B shows a configuration with an area 506 that is not energized for temporary platting affording visibility through it while having other data being displayed in the rest of the grid 505. FIG. 5C shows the grid 505 with areas 507, 508 that are not energized for temporary platting. FIG. 5D shows the grid 505 with area 509 that is not energized for temporary platting. FIG. 5E shows the grid 505 where area 510 is the area not energized for temporary platting affording the possible targeting of an image to be overlaid on an object for better recognition or anything else that assists in improving situation awareness. FIG. 5F shows the grid 505 where area 513 is not energized for temporary platting. FIG. 5G shows the grid 505 where area 514 is not energized for temporary platting.

Figure 6:
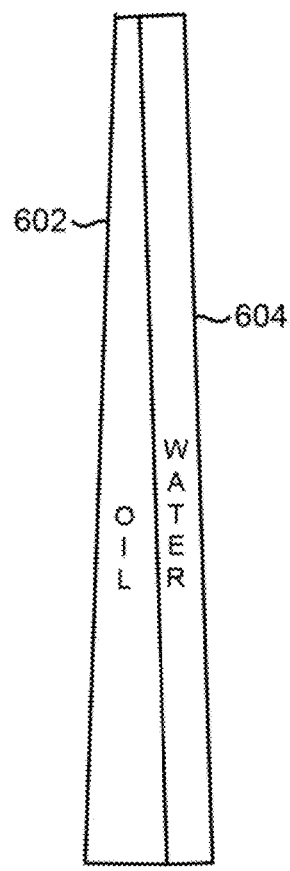
FIG. 6 is a cross sectional diagram of a tapered electrowetting lens device.

The angle of viewing the display for the user of the Enhanced Breathing Apparatus Mask Display could result in focusing difficulties even with the electrowetting lens device being used. To address this, FIG. 6 illustrates an embodiment electrowetting lens device with a tapered or nonsymmetrical housing for the two liquids 602, 604. The non symmetrical housing may enable a slight variance in the focal point for the electrowetting lens affording the user better visual clarity to observe the displayed information.

Figure 7:
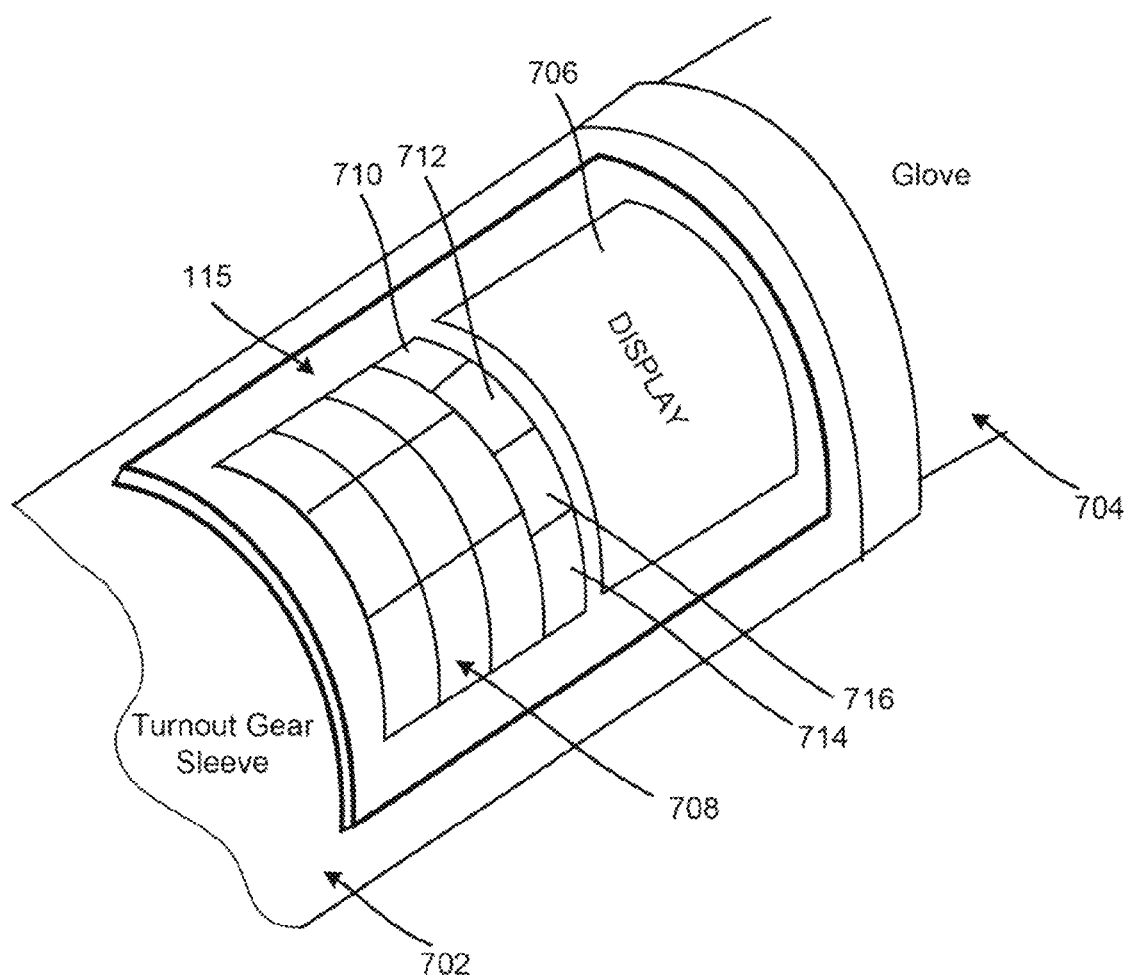
FIG. 7 is a block diagram illustrating various surface elements of an embodiment relay device.

FIG. 7 illustrates an intermediate relay device 115 that a user may wear on the wrist or forearm, and which may be used to communicate with an embodiment enhanced mask 102. The relay device 115 may be mounted on protective clothing (e.g., bunker or turnout gear, etc.) suitable for use in explosive environments by emergency services personnel. In various embodiments, the relay device 115 may be integrated, woven into, and/or permanently attached to the protective clothing and may be mounted in a variety of locations/positions on the protective clothing. In the example illustrated in FIG. 7, the relay device 115 is mounted near the end of a left jacket sleeve 702 of the protective clothing, abutting a glove area 704.

The relay device 115 may include communications circuitry (not illustrated) for sending and receiving voice, data, video, and other similar information, an electronic display 706, and a plurality of input buttons 708 that when actuated by a human user will cause the relay device 115 to perform various operations. In various embodiments, the relay device 115 may further include a microphone 710, a speaker 712, a power switch 714, and/or a camera 716.

As mentioned above, the relay device 115 may include a plurality of input buttons 708 that when actuated by a human user will cause the enhanced mask 102 to perform various operations. In various embodiments, the input buttons 708 may be implemented as hard keys, soft keys, touch keys, or via any other means suitable for receiving user input. In an embodiment, the input buttons may be configured so that they may be actuated by a human user wearing thick or flame resistant gloves.

In an embodiment, the relay device 115 may include a cursor control (not illustrated) suitable for moving, adjusting and/or panning images displayed on the electronic display 706. In an embodiment, the cursor control may be built into the electronic display 706.

Figure 8:
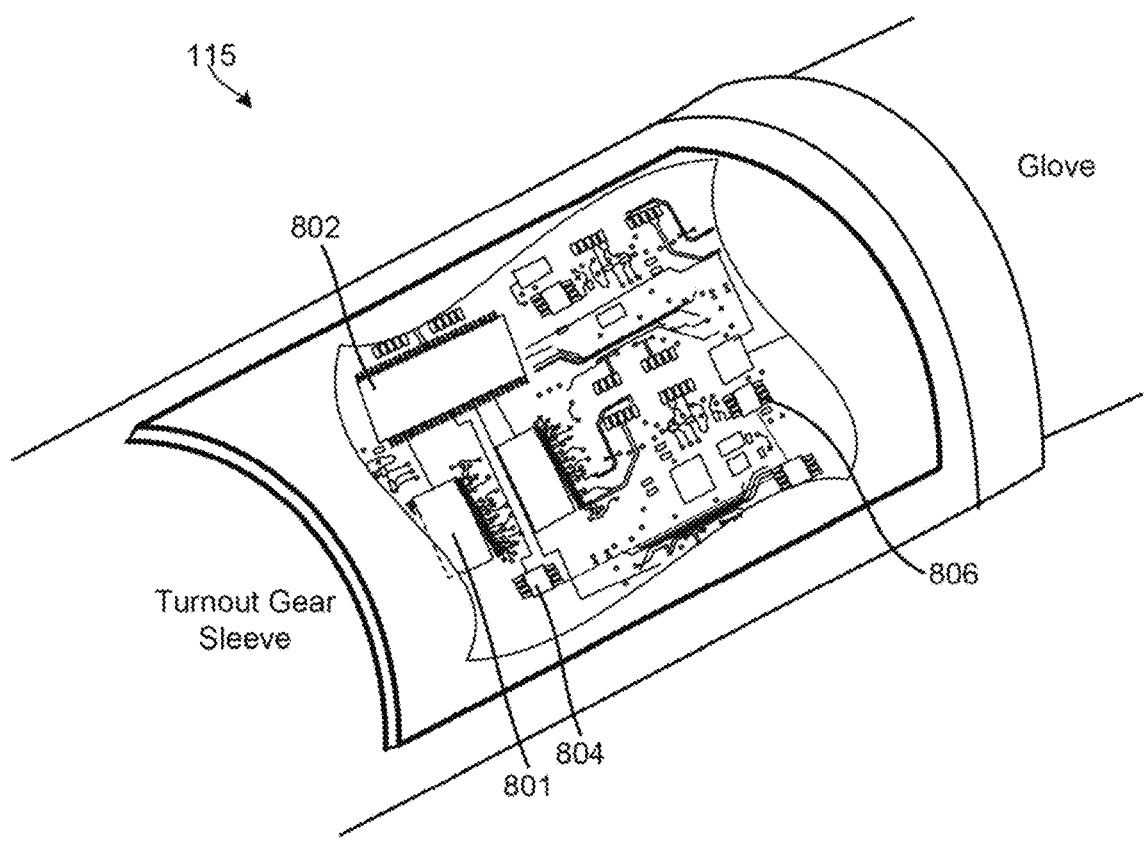
FIG. 8 is a block diagram illustrating various electronic components of an embodiment relay device.

FIG. 8 illustrates various components that may be included in an embodiment relay device 115. In the example illustrated in FIG. 8, the relay device 115 includes a processor or central processing unit (CPU) 801 coupled to internal memory 802 and antennas 804 for sending and receiving electromagnetic radiation. The antennas 804 may be connected to a wireless data link and/or one or more transceivers 806 coupled to the processor/CPU 801. The transceivers 806 may include, or may be coupled to, one or more built-in low power and/or cellular radio systems, including a Bluetooth® radio, a WiFi radio, an LTE radio module, a Peanut® radio, a ZigBee® transceiver (i.e., an IEEE 802.15.4 transceiver), and/or other low power and/or cellular radio systems currently available or which may be developed in the future.

Figure 9:
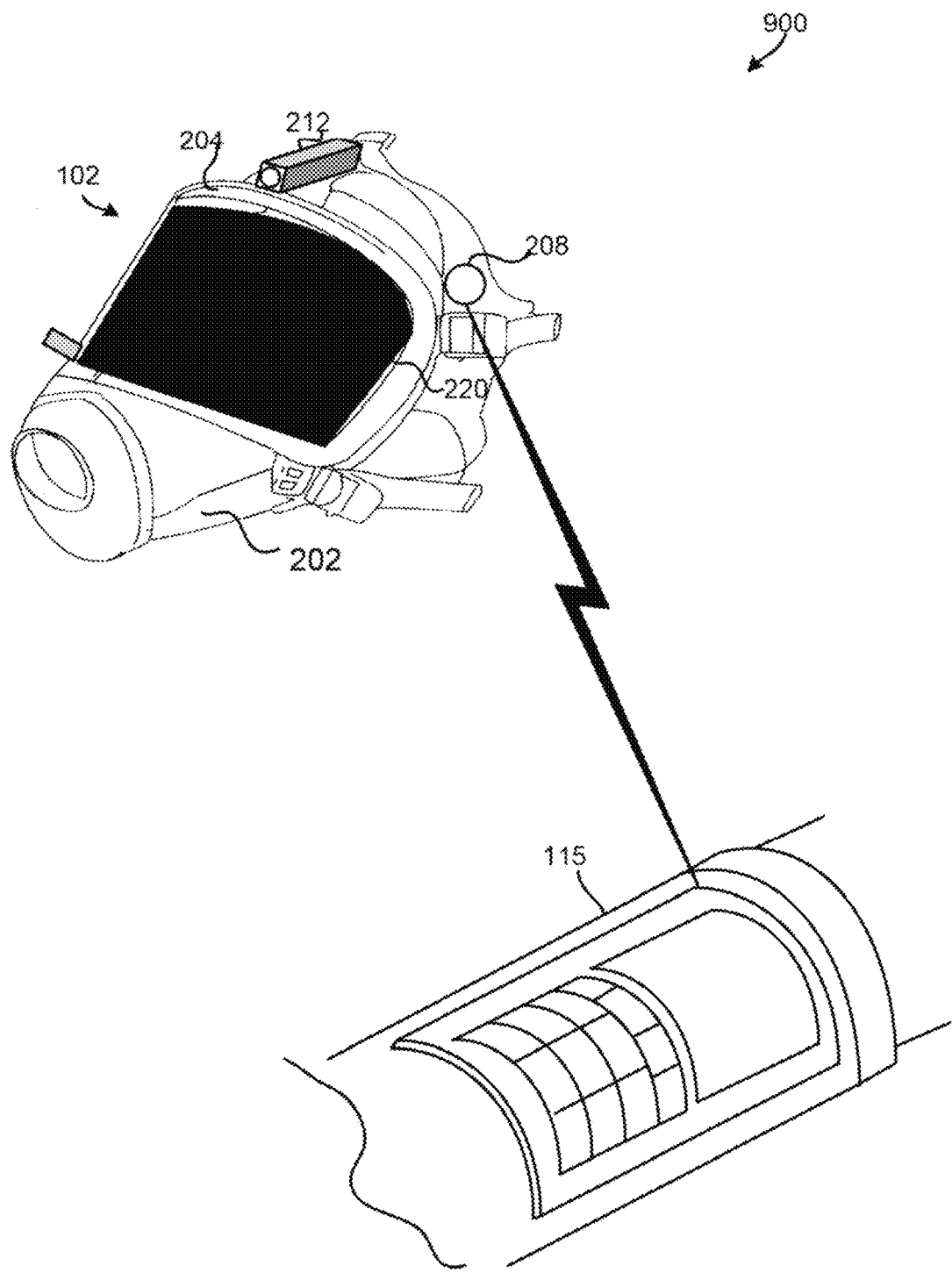
FIG. 9 is a system diagram of an embodiment mask wirelessly connected to a relay device.
Figure 10:
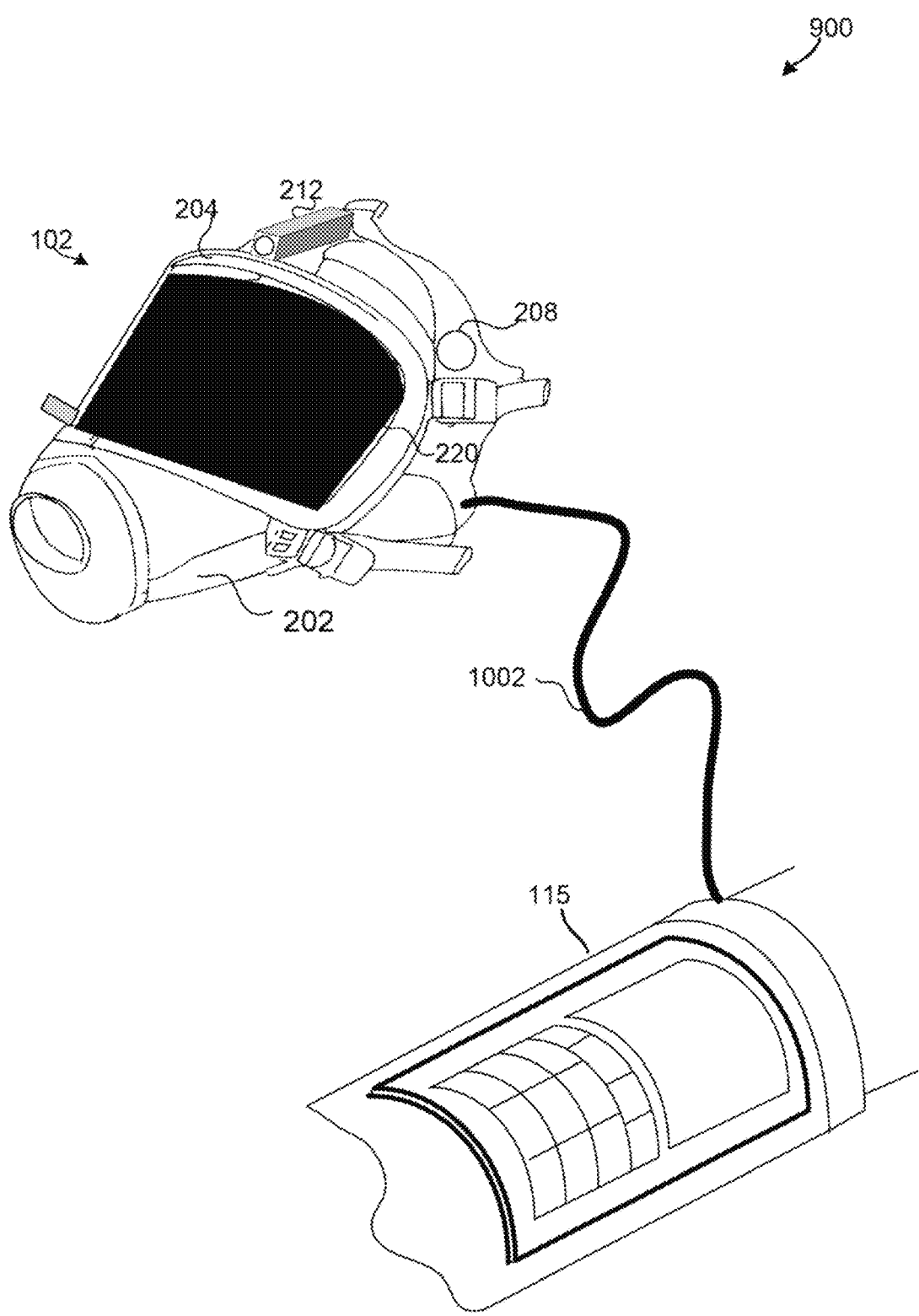
FIG. 10 is a system diagram of an embodiment mask connected by a wire to a relay device.

FIGS. 9 and 10 illustrate an embodiment system 900 that includes an enhanced breathing mask 102 in communication with a relay device 115. In the example illustrated in FIG. 9, the enhanced breathing mask 102 is connected to the relay device 115 wirelessly via radio 208. In the example illustrated in FIG. 10, the enhanced breathing mask 102 is connected to a relay device 115 via a wired connection 1002. In the various embodiments, the relay device 115 may be connected to the enhanced breathing mask 102 any known wired or wireless technologies and/or configurations.

In an embodiment, the relay device 115 may be configured to control the enhanced breathing mask 102. For example, a user may enter commands on the relay device 115 to control one or more displays (e.g., turning on/off, adjusting intensity, activating a screening mechanism, responding to displayed communications received from the radio link 208, etc.). The relay device 115 may be used to control one or more electrowetting lens devices, such as to adjust the focus.

In an embodiment, the relay device 115 may be configured to enable network communications between the enhanced breathing mask 102 and other network devices, such as a cell site 104 or radio access node 120. For example, the enhanced breathing mask 102 may be connected to the relay device by a short-range radio connection, such as a Bluetooth® connection, and the relay device 115 may have a second long range radio to communicate with another network. Alternately, the enhanced breathing mask 102 may have a second long range radio to enable communication between the relay device 115 and other network components (e.g., the enhanced breathing mask 102 could be the master and the relay device 115 could be the slave or vice versa).

Figure 11:
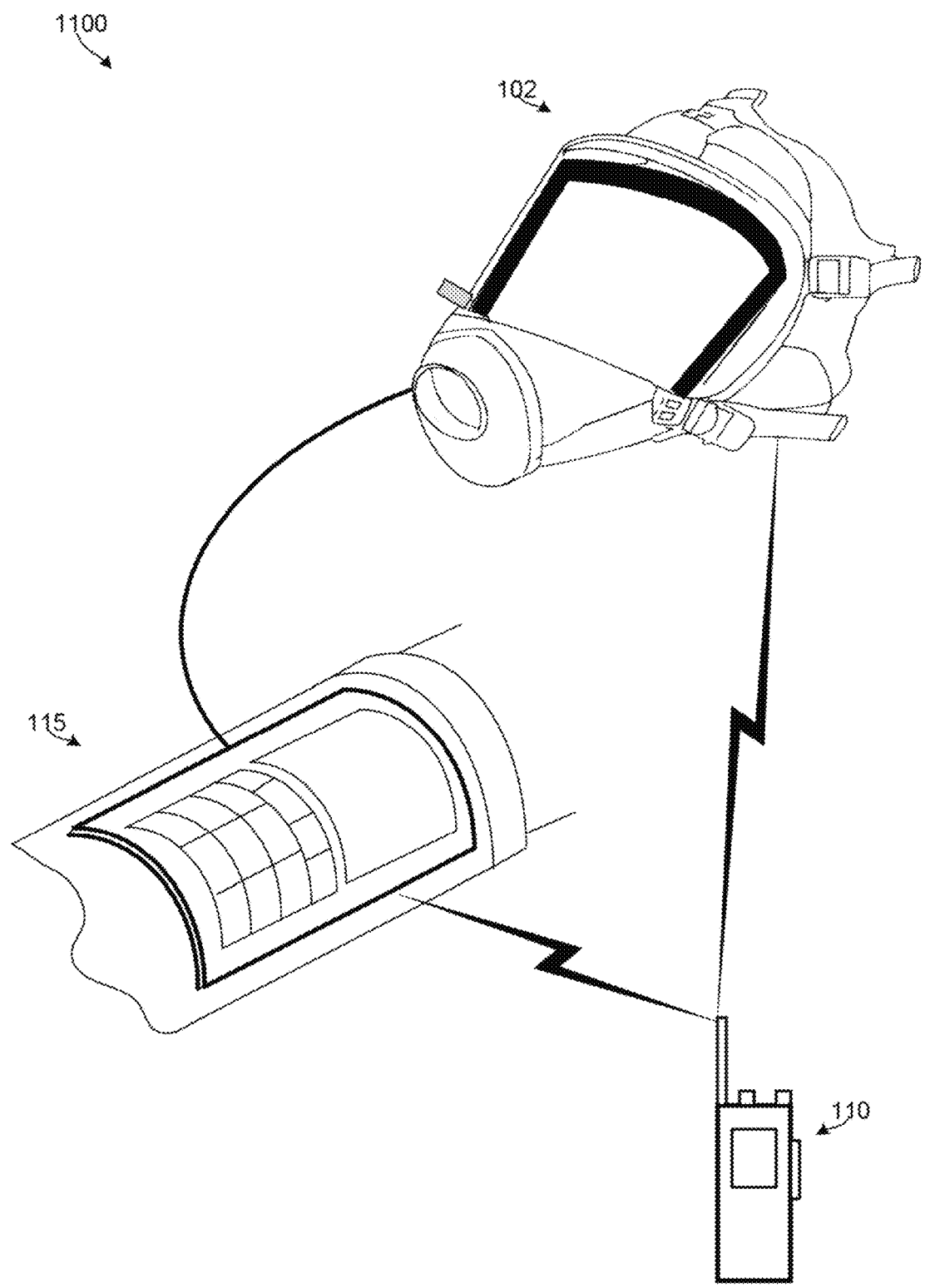
FIG. 11 is a system diagram of an embodiment mask and a relay device connected to a mobile device.

FIG. 11 illustrates an embodiment system 1100 that includes an enhanced breathing mask 102 and relay device 115 networked with a mobile device, such as a cell phone or radio. Specifically, FIG. 11 illustrates that a two way radio 110 may establish RF communication links with both the enhanced breathing mask 102 and the relay device 115. The two way radio 110 may provide a communication path to other network devices, such as a cell site 104 or radio access node 120 and enhance situation awareness using narrow band messaging including voice communications. The two way radio 110 may be a cellular device 112, such as an LTE device, or another broadband device enabling content rich material to be sent and received by the enhanced breathing mask 102 and relay device 115.

Figure 12:
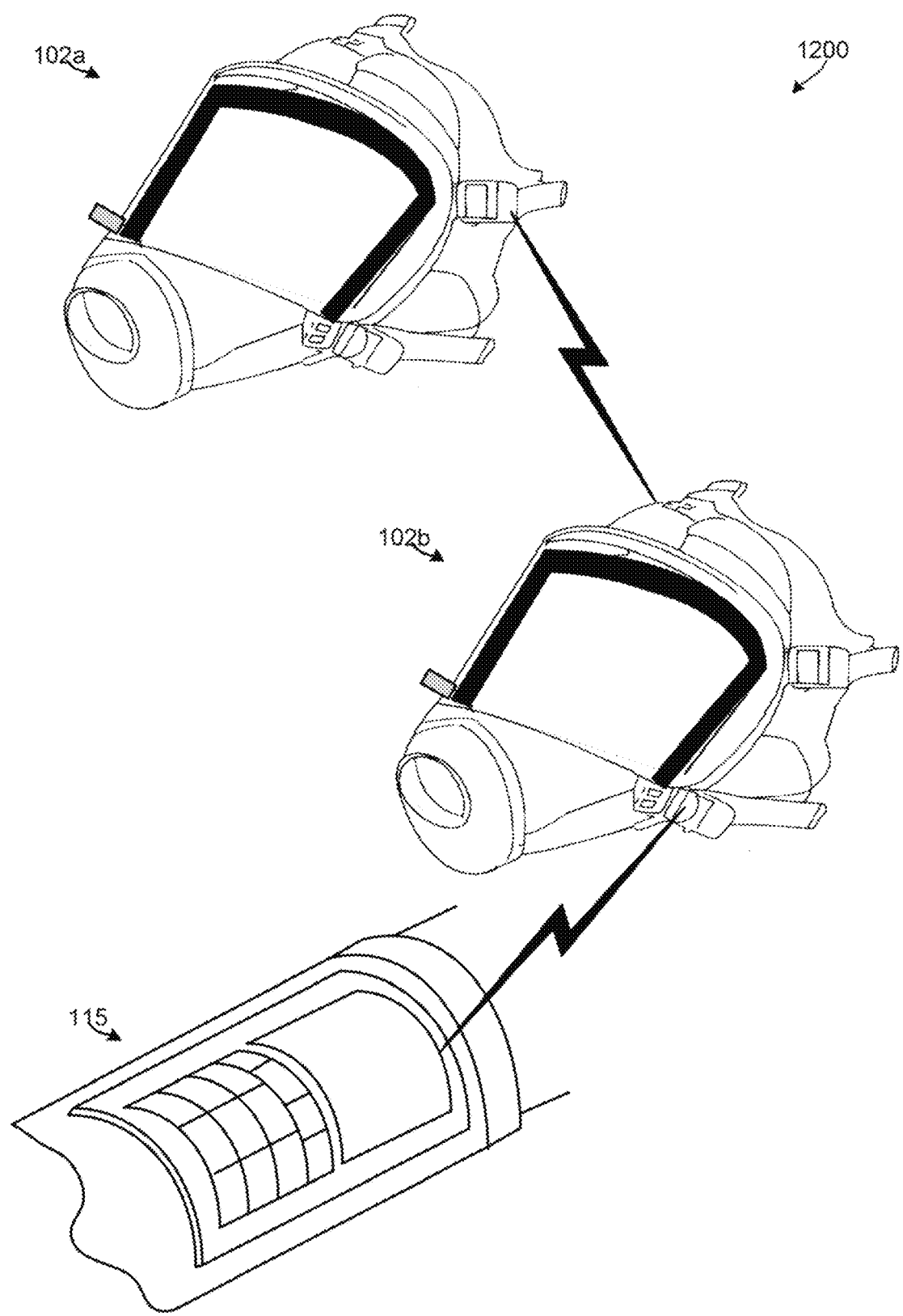
FIG. 12 is system diagram of network include multiple embodiment mask and a relay device.

In further embodiments, two or more enhanced breathing masks 102a, 102b may be networked together into another embodiment system 1200, as is illustrated in FIG. 12. One of the enhanced breathing masks 102b may also be connected to a relay device 115. The second enhanced breathing mask 102a may send and receive information to the relay device 115 via the other enhanced breathing mask 102b. The relay device 115 may transmit and receive information from both enhanced breathing masks 102a, 102b to other network devices, such as a cell site 104 or radio access node 120. In alternate embodiments, either of the enhanced breathing masks 102a, 102b may be connected to other network devices, such as a cell site 104 or radio access node 120, and communicate on behalf of the other devices.

In further embodiments, one or more enhanced breathing masks 102a, 102b and relay devices 115 may be connected in various forms of ad-hoc networks. Any one device may operate a master with the other devices as slaves or alternately the devices may communicate as peers.

In further embodiments, connections between breathing masks 102a, 102b or relay devices 115 may be managed locally by a user, such as via the intermediate relay device 115. A relay device 115 may also be used to control how information is shared between devices and when.

Figure 13A:
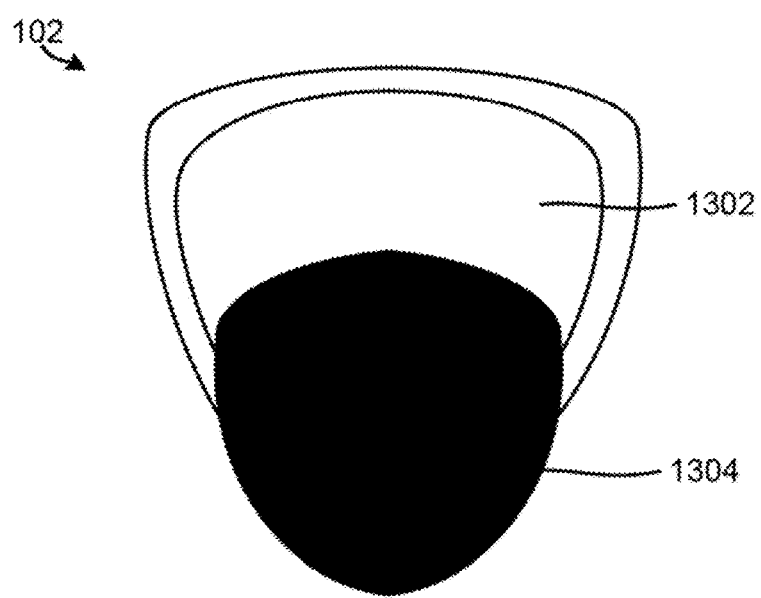
FIG. 13A is an illustration of a user point of view through a breathing apparatus mask.

FIG. 13A illustrates an inside portion of an embodiment mask 102. The enhanced mask 102 may include one or more visors 1302 through which a user/wearer may view his/her surroundings. The enhanced mask 102 may also include a nozzle portion 1304 shaped to limit air circulation and/or cover a user/wearer's mouth and face.

Figure 13B:
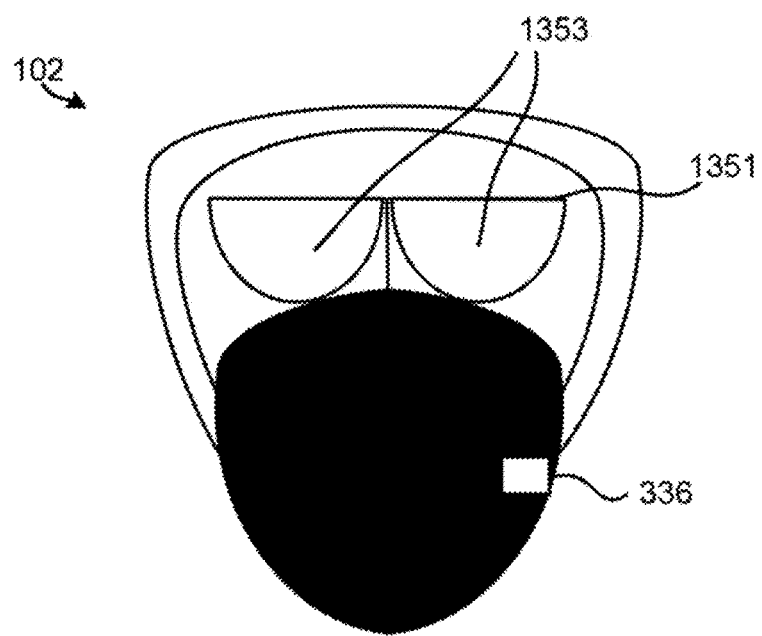
FIG. 13B is an illustration of a device for mounting embodiment electrowetting lens devices.

FIG. 13B illustrates that the mask 102 may include lenses 1353 (i.e., electrowetting lens devices and/or displays) mounted on an inside portion of a frame 1351. The enhanced mask 102 may also include one or more sensors 336 mounted on the mask.

Figure 14A:
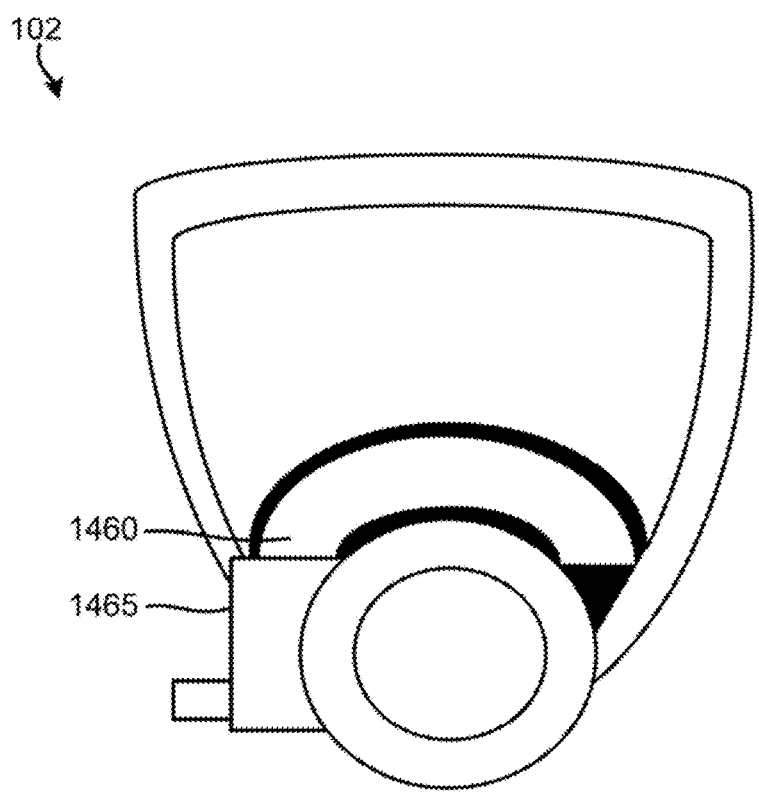
FIG. 14A is an illustration of an embodiment mask that may have sensors mounted on it.

FIG. 14A illustrates an embodiment mask 102 that includes sensors 336 mounted on an outer portion 1460 of the mask 102 and/or in a mounting device 1465 included in the mask 102. A mounting device 1465 may be configured to mount interchangeable sensors so that the sensors 336 may be interchanged with different sensors (e.g., based on the situational requirements, etc.). The sensors 336 may be configured to facilitate situation awareness for the wearer of the enhanced mask 102, fellow team members, and the incident command.

The various sensors 336 that may be included in an embodiment mask 102 include both active and passive sensors. Examples of passive sensors include carbon monoxide, oxygen, heat, near infrared and infrared, and radiation detectors. Examples of active sensors include ultrasound for ranging, spectrometry scanner for detecting hazmat chemicals including biohazards, cameras, microphones, etc.

The active and passive sensors 336 may be connected with the mask 102, such as connected to the CPU 332 as illustrated in FIG. 3B, and the sensor data could be displayed locally on the display 220 as discussed previously and/or relayed to fellow team members and incident command via the radio link 334.

Figure 14B:
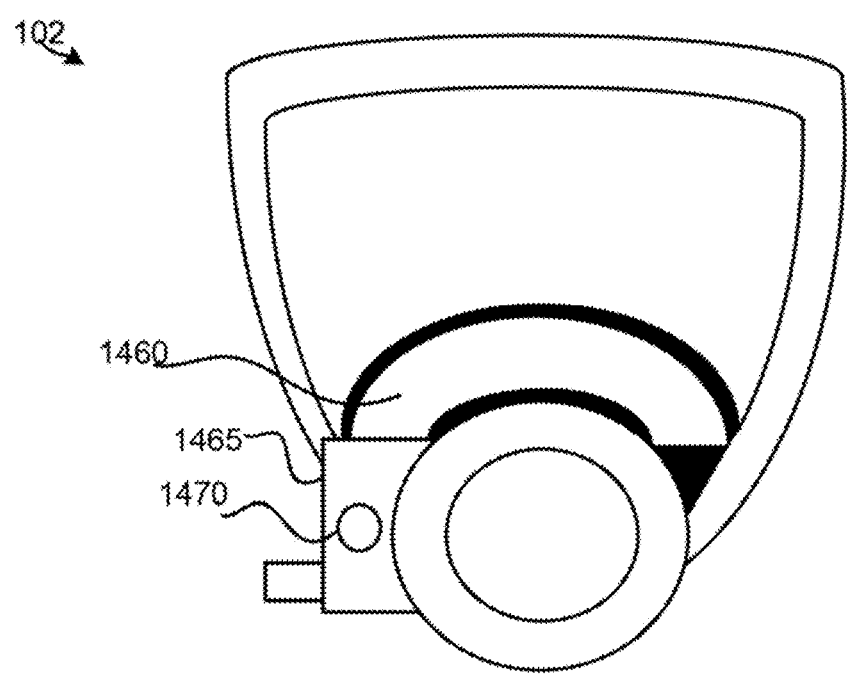
FIG. 14B is an illustration of an embodiment mask with a sensor integrated into it.

FIG. 14B shows another embodiment sensor layout on the enhanced SCBA mask in which an active sensor 1470 is integrated into the enhanced mask 102. In FIG. 14B sensor 1470 is shown as an Infrared camera that may or may not have cooling capabilities. In this embodiment, the infrared sensor is mounted in the front of the enhanced SCBA mask to provide a realistic view of what the wearer is looking at.

In various embodiments, the system may be configured to have low power consumption to ensure the display may be battery powered using small batteries, thereby increasing the weight of the breathing apparatus by grams and not kilograms.

In various embodiments, the mask may include a TOLED display configured to ensure the user continues to be able to see the outside environment, even in the event that there is damage to the TOLED during the mission or the user turns off the display. That is, the TOLED may enable the user to retain visibility when the user turns off the display and in the event of a failure/damage to the TOLED (e.g., due to the transparency of the TOLED, etc.).

In various embodiments, a TOLED and FOLED display may also be configured so that side lighting from the display provides no visual impairments that would limit a user from obtaining situation awareness. Additionally the TOLED and FOLED display may be configured and programmed to maintain a low detectability or stealth mode so that the displayed information is not visible to others via reflection or mask illumination.

Figure 15:
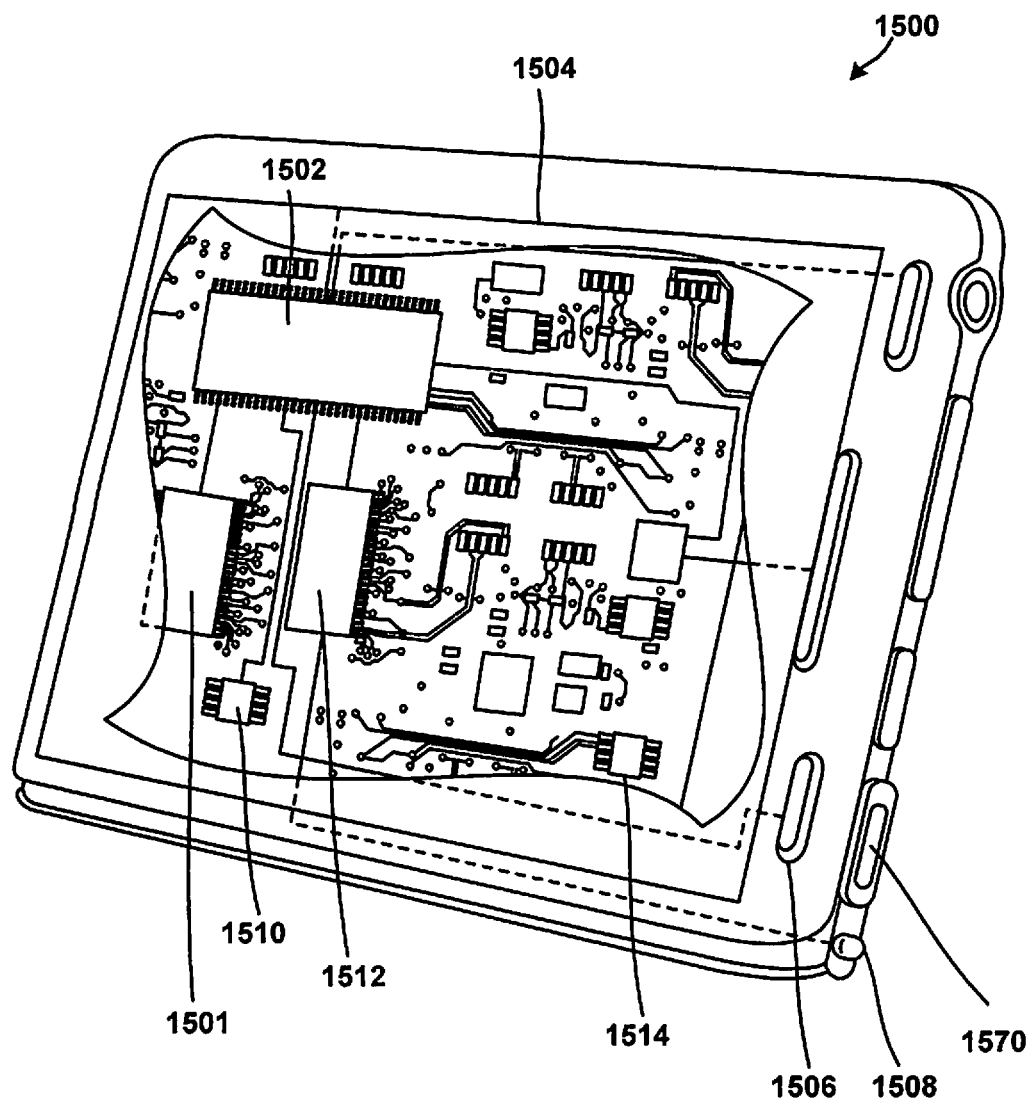
FIG. 15 is a component block diagram illustrating various components commonly included in a mobile transceiver device suitable for use in an embodiment.

FIG. 15 illustrates various components commonly included in a mobile transceiver device 1500 suitable for use as a relay module or a mobile device in the various embodiments. A typical mobile transceiver device 1500 include a processor 1501 coupled to internal memory 1502, a display 1504, and to a speaker 1506. In addition, the mobile transceiver device 1500 may include an antenna 1508 for sending and receiving electromagnetic radiation that may be connected to a wireless data link and/or cellular telephone transceiver 1510 coupled to the processor 1501. Mobile transceiver devices 1500 also typically include menu selection buttons or rocker switches 1570 for receiving user inputs.

A typical mobile transceiver device 1500 also includes a sound encoding/decoding (CODEC) circuit 1512 which digitizes sound received from a microphone into data packets suitable for wireless transmission and decodes received sound data packets to generate analog signals that are provided to the speaker 1506 to generate sound. Also, one or more of the processor 1501, transceivers 1510, and CODEC 1512 may include a digital signal processor (DSP) circuit (not shown separately). The mobile transceiver device 1500 may further include a Peanut® or a ZigBee® transceiver (i.e., an IEEE 802.15.4 transceiver) 1514 for low-power short-range communications between wireless devices, or other similar communication circuitry (e.g., circuitry implementing the Bluetooth® or WiFi protocols, etc.).

Figure 16:
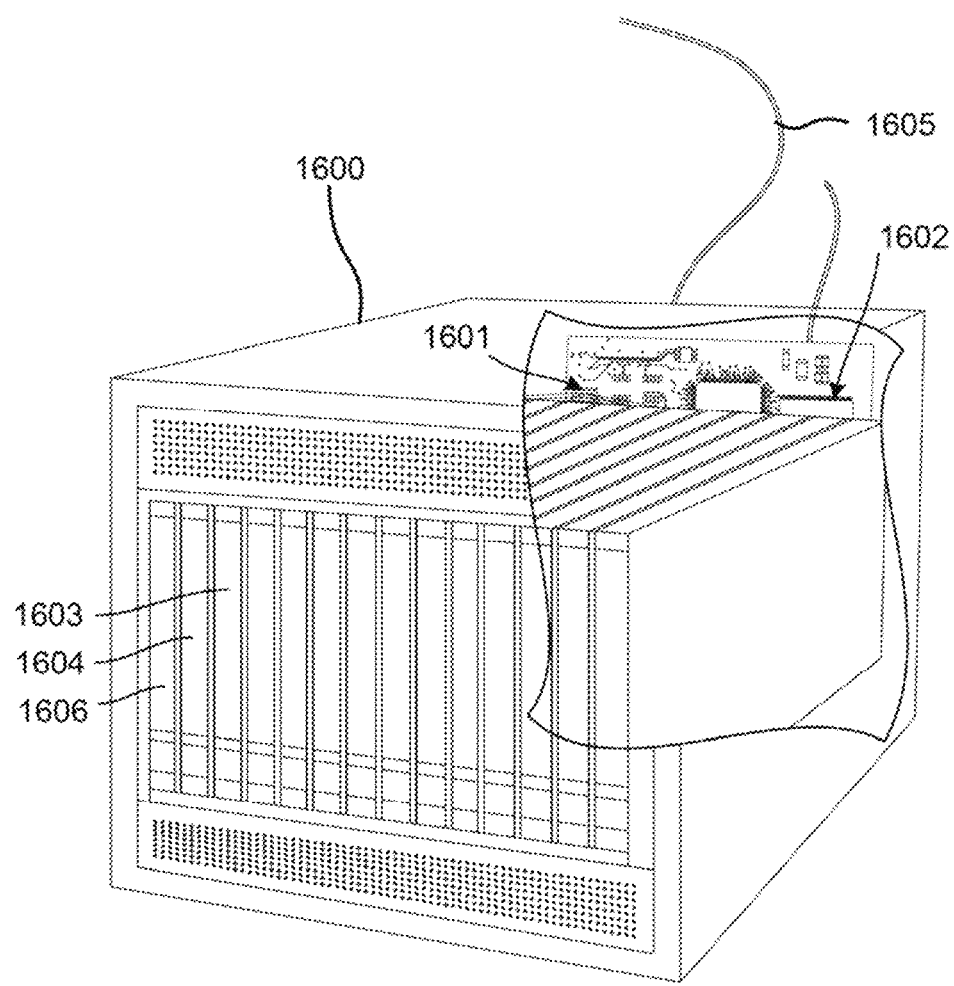
FIG. 16 is a component block diagram of a server suitable for use in an embodiment.

The various embodiments may be implemented on any of a variety of commercially available server devices for performing remote processing (e.g., image recognition and enhancement), such as the server 1600 illustrated in FIG. 16. Such a server 1600 typically includes one or more processors 1601, 1602 coupled to volatile memory 1603 and a large capacity nonvolatile memory, such as a disk drive 1604. The server 1600 may also include a floppy disc drive, compact disc (CD) or DVD disc drive 1606 coupled to the processor 1601. The server 1600 may also include network access ports coupled to the processor 1601 for establishing data connections with a network 1605, such as a local area network coupled to other communication system computers and servers.

The processors 1501, 1601 and 1602 may be any programmable microprocessor, microcomputer or multiple processor chip or chips that may be configured by software instructions (applications) to perform a variety of functions, including the functions of the various embodiments described below. In some mobile devices, multi-core processors 1602 may be provided, such as one processor core dedicated to wireless communication functions and one processor core dedicated to running other applications. Typically, software applications may be stored in the internal memory before they are accessed and loaded into the processor 1501, 1601 and 1602. The processors 1501, 1601 and 1602 may include internal memory sufficient to store the application software instructions.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein The hardware used to implement the foregoing embodiments may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method steps corresponding to the above methods. Alternatively, some steps or methods may be performed by circuitry that is specific to a given function.

What is claimed is:
1. A breathing device, comprising:
a non-conductive housing;
a visor;
an electrowetting control circuit configured to apply an electric field to fluids via electrodes;
a first control knob configured to adjust a first focal length within a first range;
a second control knob configured to adjust a second focal length within a second range, wherein the first range does not overlap the second range;
a transparent electronic display coupled to the visor and configured so that a user may simultaneously view data and video on the transparent electronic display and look through the visor;
a first adjustable electrowetting lens device having a tapered housing for two or more liquids, wherein the first adjustable electrowetting lens device is coupled to the first control knob, the electrowetting control circuit and the transparent electronic display;
a second adjustable electrowetting lens device coupled to the second control knob and the electrowetting control circuit;
an inhalation connection configured to provide human-breathable air inside of the non-conductive housing;
a receiver configured to receive wireless communication signals;
communications circuitry for sending and receiving data and video information to and from a local small cell site; and
a processor coupled to the transparent electronic display, the electrowetting control circuit, and the receiver, wherein the processor is configured with processor executable software instructions to perform operations comprising:
receiving data via a wireless communication link;
rendering the received data on the transparent electronic display;
rendering received video on the transparent electronic display;
adjusting the first focal length of the first adjustable electrowetting lens device via the first control knob and the electrowetting control circuit; and
adjusting the second focal length of the second adjustable electrowetting lens device via the second control knob and the electrowetting control circuit, and
wherein the visor, receiver, electrowetting control circuit, and communication circuitry are all hermetically sealed inside the non-conductive housing.

2. The breathing device of claim 1, wherein the transparent electronic display is a flexible light emitting diode display.

3. The breathing device of claim 1, wherein the transparent electronic display is coupled to the visor inside the non-conductive housing.

4. The breathing device of claim 1, wherein the transparent electronic display is coupled to the visor outside the non-conductive housing.

5. The breathing device of claim 1, further comprising an adjustable focusing device coupled to the transparent electronic display.

6. The breathing device of claim 1, wherein:
the second adjustable electrowetting lens device comprises a tapered housing;
the transparent electronic display is a contoured display configured to automatically adjust for ambient light.

7. The breathing device of claim 1, further comprising a sensor module hermetically sealed inside the non-conductive housing, wherein the processor is configured with processor executable software instructions to perform operations further comprising:
rendering output from the sensor module on the transparent electronic display.

8. The breathing device of claim 7, wherein the sensor module includes a near infrared sensor, or an infrared detector.

9. The breathing device of claim 7, wherein the sensor module includes an ultrasound device or a spectrometry device.

10. A communication system for use in a toxic environment, comprising:
a first breathing device in communication with a second breathing device, wherein each of the first and second breathing devices comprise:
a non-conductive housing;
a visor;
an electrowetting control circuit configured to apply an electric field to fluids via electrodes;
a first control knob configured to adjust a first focal length within a first range;
a second control knob configured to adjust a second focal length within a second range, wherein the first range does not overlap the second range;
a transparent electronic display coupled to the visor and configured so that a user may simultaneously view data and video on the transparent electronic display and look through the visor;
a first adjustable electrowetting lens device having a tapered housing for two or more liquids, wherein the first adjustable electrowetting lens device is coupled to the first control knob, the electrowetting control circuit and the transparent electronic display;
a second adjustable electrowetting lens device coupled to the second control knob and the electrowetting control circuit;
an inhalation connection configured to provide human-breathable air inside of the non-conductive housing;
a receiver configured to receive wireless communication signals;
communications circuitry for sending and receiving data and video information to and from a local small cell site; and
a processor coupled to the transparent electronic display, the electrowetting control circuit, and receiver, wherein the processor is configured with processor executable software instructions to perform operations comprising:
receiving data via a wireless communication link;
rendering the received data on the transparent electronic display;
rendering the video on the transparent electronic display; and
adjusting the first focal length of the first adjustable electrowetting lens device via the first control knob and the electrowetting control circuit; and
adjusting the second focal length of the second adjustable electrowetting lens device via the second control knob and the electrowetting control circuit,
wherein the visor, receiver, electrowetting control circuit, and communication circuitry are all hermetically sealed inside the non-conductive housing, and
wherein the processor of the first breathing device is configured with processor executable software instructions to perform operations further comprising establishing a communication link with the second breathing device.

11. The breathing device of claim 1, wherein the receiver and communication circuitry are each sealed hermetically within separate non-conductive housings.

* * * * *